US009244920B2

(12) United States Patent  (10) Patent No.: US 9,244,920 B2
Morimoto et al.  (45) Date of Patent: Jan. 26, 2016

(54) FORENSIC SYSTEM, FORENSIC METHOD, AND FORENSIC PROGRAM

(71) Applicant: UBIC, Inc., Tokyo (JP)

(72) Inventors: Masahiro Morimoto, Tokyo (JP); Yoshikatsu Shirai, Tokyo (JP); Hideki Takeda, Tokyo (JP)

(73) Assignee: UBIC, Inc., Tokyo (JP)

( * ) Notice: Subject to any disclaimer, the term of this patent is extended or adjusted under 35 U.S.C. 154(b) by 52 days.

(21) Appl. No.: 14/194,640

(22) Filed: Feb. 28, 2014

(65) Prior Publication Data

US 2014/0330812 A1  Nov. 6, 2014

Related U.S. Application Data

(62) Division of application No. 13/514,295, filed as application No. PCT/JP2011/057142 on Mar. 24, 2011, now Pat. No. 8,793,277.

(30) Foreign Application Priority Data

Mar. 29, 2010  (JP) ................................. 2010-075961

(51) Int. Cl.
  *G06F 7/00*  (2006.01)
  *G06F 17/30*  (2006.01)
  *G06Q 10/10*  (2012.01)
  *G06Q 50/18*  (2012.01)

(52) U.S. Cl.
  CPC .......... *G06F 17/30011* (2013.01); *G06Q 10/10* (2013.01); *G06Q 50/18* (2013.01)

(58) Field of Classification Search
  None
  See application file for complete search history.

(56) References Cited

U.S. PATENT DOCUMENTS 6,381,602 B1 * 4/2002 Shoroff ............... G06F 21/6227
  707/741
6,493,706 B1  12/2002 Mead et al.
  (Continued)

FOREIGN PATENT DOCUMENTS

CN  1934567 A  3/2007
CN  1965313 A  5/2007
  (Continued)

OTHER PUBLICATIONS

Morimoto Masahiro, Computer & Network LAN, (http://www.ohmsha.co.jp/), Mar. 2005.
  (Continued)

*Primary Examiner* — Polina Peach
(74) *Attorney, Agent, or Firm* — Sughrue Mion, PLLC

(57) ABSTRACT

Embodiments of the inventive concept can extract digital document information related with a specific individual to achieve a work load reduction associated with evidentiary material preparation for litigation. Recorded digital information can be displayed and user-specifying information can be set for each of a plurality of document files. The user-specifying information shows which user contained in user information one or more document files is related with. A recording unit can record the set user-specifying information. At least one user is selected, and a document file where user-specifying information which corresponds to the selected user was set is searched. Additional information showing whether or not the searched document file is related with the litigation is set via a display unit. A document file which is related with litigation is outputted based on the additional information.

4 Claims, 4 Drawing Sheets

(56) References Cited

U.S. PATENT DOCUMENTS

| | | | |
|---|---|---|---|
| 6,820,081 | B1 | 11/2004 | Kawai et al. |
| 7,392,246 | B2* | 6/2008 | Bhaghavan ....... G06F 17/30427 |
| 7,716,196 | B2 | 5/2010 | Ghielmetti et al. |
| 7,890,493 | B2 | 2/2011 | Chen |
| 7,899,781 | B1 | 3/2011 | Pittman et al. |
| 8,001,129 | B2 | 8/2011 | Arumainayagam et al. |
| 8,171,041 | B2 | 5/2012 | Bennett |
| 8,214,391 | B2 | 7/2012 | Denesuk et al. |
| 8,412,628 | B2 | 4/2013 | Beach et al. |
| 8,527,523 | B1* | 9/2013 | Ravid ................ G06F 17/30648 706/54 |
| 2001/0027451 | A1 | 10/2001 | Taguchi et al. |
| 2002/0083079 | A1 | 6/2002 | Meier et al. |
| 2002/0138250 | A1 | 9/2002 | Okura et al. |
| 2003/0182310 | A1 | 9/2003 | Charnock et al. |
| 2004/0006594 | A1 | 1/2004 | Boyer et al. |
| 2005/0027750 | A1 | 2/2005 | Martin et al. |
| 2005/0086179 | A1 | 4/2005 | Mehmet |
| 2005/0203899 | A1 | 9/2005 | Anderson et al. |
| 2006/0004702 | A1 | 1/2006 | St. John et al. |
| 2006/0129445 | A1* | 6/2006 | McCallum ........................ 705/8 |
| 2006/0143155 | A1 | 6/2006 | Kagimasa et al. |
| 2007/0005637 | A1 | 1/2007 | Juliano et al. |
| 2007/0130100 | A1 | 6/2007 | Miller |
| 2007/0150259 | A1 | 6/2007 | Akahane et al. |
| 2007/0271517 | A1* | 11/2007 | Finkelman ........ G06F 17/30864 715/742 |
| 2008/0046260 | A1 | 2/2008 | Ghielmetti et al. |
| 2008/0208838 | A1 | 8/2008 | Friedlander et al. |
| 2008/0222108 | A1 | 9/2008 | Prahlad et al. |
| 2009/0083328 | A1 | 3/2009 | Vivona et al. |
| 2009/0150168 | A1 | 6/2009 | Schmidt |
| 2009/0165026 | A1 | 6/2009 | Paknad et al. |
| 2009/0217360 | A1 | 8/2009 | Tsuchiya et al. |
| 2009/0276406 | A1* | 11/2009 | Kelley ............................... 707/3 |
| 2009/0288164 | A1 | 11/2009 | Adelstein et al. |
| 2009/0292743 | A1 | 11/2009 | Bigus et al. |
| 2009/0326917 | A1 | 12/2009 | Hegenberger |
| 2010/0094910 | A1 | 4/2010 | Bayliss |
| 2010/0150453 | A1 | 6/2010 | Ravid et al. |
| 2010/0250531 | A1 | 9/2010 | Andersen et al. |
| 2010/0250573 | A1 | 9/2010 | Mayer et al. |
| 2011/0093471 | A1* | 4/2011 | Brockway et al. ............ 707/747 |
| 2011/0098999 | A1 | 4/2011 | Amini et al. |
| 2011/0286584 | A1 | 11/2011 | Angel et al. |

FOREIGN PATENT DOCUMENTS

| | | | |
|---|---|---|---|
| CN | 101546364 | A | 9/2009 |
| CN | 102834832 | A | 12/2012 |
| JP | 06044325 | | 2/1994 |
| JP | 11272671 | | 10/1999 |
| JP | 2001222477 | A | 8/2001 |
| JP | 2003288365 | A | 10/2003 |
| JP | 2003345798 | A | 12/2003 |
| JP | 2006178521 | A | 7/2006 |
| JP | 2007148731 | A | 6/2007 |
| JP | 2007172221 | A | 7/2007 |
| JP | 2007334412 | A | 12/2007 |
| JP | 2008097484 | | 4/2008 |
| JP | 2009015659 | A | 1/2009 |
| JP | 2009205220 | A | 9/2009 |
| JP | 2009276862 | A | 11/2009 |
| JP | 2009294896 | A | 12/2009 |
| KR | 20130018640 | A | 2/2013 |
| WO | 2007044709 | | 4/2007 |
| WO | 2007067424 | A | 6/2007 |

OTHER PUBLICATIONS

Extended European Search Report for EP11762662.2, mailed Sep. 6, 2013.
Extended European Search Report for EP11762663.0, mailed Aug. 27, 2013.
Final Office Action for U.S. Appl. No. 13/514,295, mailed Jan. 9, 2013.
Final Office Action for U.S. Appl. No. 13/514,966, mailed Feb. 22, 2013.
Final Office Action for U.S. Appl. No. 13/514,966, mailed Oct. 9, 2013.
Final Office Action for U.S. Appl. No. 13/514,981, mailed Mar. 14, 2013.
International Search Report dated Apr. 11, 2011 corresponding to International Patent Application No. PCT/JP2011/057141.
International Search Report dated Apr. 19, 2011 corresponding to International Application No. PCT/JP2011/057142.
International Search Report dated Oct. 4, 2011 corresponding to PCT/JP2011/067055.
JP 11-272671 Shimazu Miwako and Yoshimura Yumiko Machine Translation of the applicant's IDS, Aug. 10, 1999.
Juan Jose Garda Adeva et al. "Multilingual Approaches to Text Categorisation", 2006, University of Sydney.
Li et al. "Advanced teaming algorithms for cross-language patent retrieval and classification", Apr. 27, 2007, Information Processing & Management, Elsevier, Barking, G8, vol. 43, pp. 1183-1199.
Notice of Allowance for U.S. Appl. No. 13/514,295, mailed Oct. 29, 2013.
Notice of Allowance for U.S. Appl. No. 13/514,981, mailed Jul. 15, 2013.
Office Action for U.S. Appl. No. 13/514,295, mailed May 7, 2013.
Office Action for U.S. Appl. No. 13/514,295, mailed Sep. 18, 2012.
Office Action for U.S. Appl. No. 13/514,966, mailed May 16, 2013.
Office Action for U.S. Appl. No. 13/514,966, mailed Nov. 9, 2012.
Office Action for U.S. Appl. No. 13/514,981, mailed Nov. 28, 2012.
Rigutini et al. "An EM based training algorithm for Cross-Language Text Categorization", 2005, IEEE, pp. 529-535.
Takahashi et al., "Complexity Analysis of Retrieving Knowledge from Auditing Log Files for Computer and Network Forensics and Accountability," IEEE International Conference on Communications, 2008: ICC '08 ; May 19-23, 2008, Beijing, China, IEEE, Piscataway, NJ, USA, May 19, 2008, pp. 1474-1478.
Written Opinion dated Apr. 11, 2011 corresponding to International Application No. PCT/JP2011/057142.
Written Opinion dated Apr. 11, 2011 corresponding to International Patent Application No. PCT/JP2011/057141.
Written Opinion dated Oct. 10, 2011 corresponding to PCT/JP2011/067055.
Notice of Reasons for Rejection, mailed Jul. 28, 2015, issued in related JP Application No. 2014-253851, 6 pages in English and Japanese.

* cited by examiner

FORENSIC SYSTEM, FORENSIC METHOD, AND FORENSIC PROGRAM

BACKGROUND

1. Technical Field

Embodiments of the inventive concept relate to a forensic system, method, and program, and in particular, to a forensic system, method, and program for collecting digital document information relating to litigation.

2. Background Art

Conventionally, when a crime or a legal conflict relating to a computer such as unauthorized access or leakage of confidential information or other so-called "forensic" events occur, a means or a technique for collecting and analyzing devices, data, or electronic records required for investigation into the cause or to otherwise clarify legal evidences thereof have been proposed.

Particularly, in civil litigation in United State of America, since such a procedure as eDiscovery is required, both a plaintiff and a defendant involved in the litigation must submit all related digital information as evidences. They also need to submit digital information recorded in computers and/or servers as evidentiary material as well.

Due to the rapid development and spreading of information technologies, most information that is being produced in today's world is being produced or otherwise replicated by computers, such that massive amounts of digital information are generated, even within the same company.

Therefore, in the preparatory work of gathering evidentiary material for submission to a court of law or other party, mistakes can occur where even confidential digital information, which is not necessarily related with the litigation, is nevertheless inadvertently submitted together with the evidentiary materials, which can cause legal waiver issues and other problems.

In recent years, techniques related to forensic systems have been proposed in JP-A-2006-178521 and JP-A-2007-148731. JP-A-2006-178521 discloses a forensic system where identification of a wrongdoer can be performed efficiently by a method which allows testimony to evidentiary conservation, whereby reliability of the identification is robust against human factors.

JP-A-2007-148731 discloses a forensic system where a forensic related system performs an ex-post handling, such as identification of a criminal, in connection with a legal action or determination such as an amount of loss compensation in an information damage insurance system, which pays insurance coverage due to leakage of personal information.

However, the forensic systems of JP-A-2006-17852 and JP-A-2007-148731 eventually collect an enormous amount of digital document information relating to users who might have used the computers or the servers.

Under such a situation that an operator cannot accurately grasp which user utilized (e.g., produced, edited, or browsed) the digital document information, determining whether or not each of the collected digital document information is valid as evidentiary material for litigation purposes is problematic because it is labor and cost intensive.

In view of these circumstances, it would be desirable to provide a forensic system, method, and program that can accurately determine and/or set which user digital document information is related to the litigation after the digital document information is collected.

SUMMARY

In an aspect of the inventive concept, there is provided a forensic system which acquires digital information recorded on a plurality of computers or a server to analyze the acquired digital information. The forensic system may comprise: a digital information acquiring unit configured to acquire digital information containing digital document information composed of a plurality of document files, and to acquire user information about users using the plurality of computers or the server; a recording unit configured to record therein the digital information acquired by the digital information acquiring unit; a display unit configured to display the recorded digital information; a user-specifying information setting unit configured to set user-specifying information showing which one of users contained in the user-specifying information each of the plurality of document files is related with, and configured to cause the recording unit to record the set user-specifying information, via the display unit; a user selecting unit configured to select at least one user via the display unit; a searching unit configured to search a document file where the user-specifying information corresponding to the selected user was set; an additional information setting unit configured to set additional information showing whether or not the searched document file is related with litigation; and an output unit configured to output the document file which is related with the litigation, based on the additional information.

The "user-specifying information setting unit" is one which is configured to set user-specifying information showing which one of users contained in the user-specifying information each of the plurality of document files is related with to record the set user-specifying information in the recording unit via the display unit. The "user-specifying information setting unit" sets, for each document file, a user who utilized the document file.

Since the user information recorded on a plurality of computers or a server need not necessarily contain all users related with litigation, the "user-specifying information setting unit" may set a new user manually in addition to the automatically gathered users according to an operator's instruction. For example, the "user-specifying information setting unit" may set, to a document file, user-specifying information showing that a plurality of users are related with the document file. The "user-specifying information setting unit" may set a single document file to be related with a single user, or it may set a single document file as having been utilized by a plurality of users. The "user-specifying information setting unit" may also be a unit which can set, to user information, that a plurality of users are related with a document file, and ranking information showing a relative rank of relationship of each of a plurality of users with litigation. While setting a plurality of users to a single document file, the "user-specifying information setting unit" can set the rank showing which one of the set users is highly related with litigation. The "user-specifying information setting unit" may also select a rank in the ranking information, and the searching unit may search a document file where user-specifying information corresponding to a user having the selected rank was set.

The term "digital information acquiring unit" may mean a unit which may acquire digital information recorded in a plurality of computers or a server. For example, a method for acquiring the digital information may include a method for copying digital information recorded in the computers or the server in an electronic medium to copy the digital information in a forensic system via the electronic medium, and/or a method for connecting the computers or the server and the forensic system to each other via a network line to copy digital information recorded in the computers or the server in the forensic system, thereby performing preservation of digital information. Moreover, the digital information acquiring unit may include a unit to acquire second digital information containing second digital document information and second user information, the second digital information being recorded in a second server different from the server. The forensic system may be a system which searches not only the digital document information but also a plurality of document files including the second digital document information.

The forensic system of the inventive concept may further comprise a text information extracting unit configured to extract text information for each of the plurality of document files from the recorded digital document information; and a keyword selecting unit configured to select a keyword, wherein the searching unit is configured to search a document file including the selected keyword, based on the extracted text information; and the additional information setting unit is configured to set additional information to the searched document file.

In one aspect of the inventive concept, the forensic system further comprises a data converting unit configured to convert document files in the digital document information recorded in the recording unit into a predetermined data format, wherein the document files converted by the data converting unit may be processed with the same data format as the converted data format in a period before they are outputted by the output unit.

In one aspect of the inventive concept, the forensic system further comprises a statistical data producing unit configured to produce statistical data represented by data size for each data format of the acquired digital document information or statistical data represented by data size for each data format of the searched digital document information.

In one aspect of the inventive concept, the forensic system further comprises a clock unit that, when digital information is newly acquired, is configured to clock a date and time of the acquisition of the digital information, the digital information further including folder information saving the digital document information, wherein the digital information acquiring unit is configured to acquire the digital document information and the folder information which were produced after a time and date previously clocked by the clock unit, and is configured to acquire user information related with the acquired digital document information.

The term "server" may mean one or more servers, or a combination of a plurality of servers. Further, for example, the server may include at least two of a mail server, a file server, and a document managing server.

In one aspect of the inventive concept, the forensic system is provided with a plurality of additional information setting units where additional information can be set by different operators.

The term "display unit" may mean a display device to display digital information. The term "displays the recorded digital information" may mean displaying all of the user information and the digital document information, displaying at least one of these, or displaying at least one attribute (e.g., names of users, file names of document files, and/or document files).

The term "output unit" may mean any suitable unit to output or otherwise produce digital document information. For example, the output unit may be a printer or a device to produce a digital document file.

The term "user information" indicates information showing users recorded on a computer and/or a server. The user information may include a user ID showing who utilized the computer and/or the server, information showing a user who actually edited, produced, or browsed a document file, and/or access information showing when and which digital document information the user accessed.

In an another aspect of the inventive concept, there is provided a forensic method for acquiring digital information recorded on a plurality of computers or a server to analyze the acquired digital information. The method may comprise: acquiring digital information containing digital document information composed of a plurality of document files, and user information about a user utilizing the plurality of computers or the server; recording digital information acquired by the digital information acquiring unit; displaying the recorded digital information; setting user-specifying information showing which one of users contained in the user information each of the plurality of document files is related with, and causing the recording unit to record the set user-specifying information; selecting at least one user; searching a document file where user-specifying information corresponding to the selected user was set; setting additional information showing whether or not the searched document file is related with litigation; and outputting the document file related with the litigation based on the additional information.

In one aspect of the inventive concept, there is provided a non-transitory forensic program which acquires digital information recorded on a plurality of computers or a server to analyze the acquired digital information, the forensic program causing a computer to execute: a function of recording digital information acquired by the digital information acquiring unit; a function of displaying the recorded digital information; a function of setting user-specifying information showing which one of users contained in the user information each of the plurality of document files is related with, and causing the recording unit to record the set user-specifying information; a function of selecting at least one user; a function of searching a document file where user-specifying information corresponding to the selected user was set; a function of setting additional information showing whether or not the searched document file is related with litigation; and a function of outputting the document file related with the litigation based on the additional information.

The above-described summary does not necessarily include all of the features or combinations of the inventive concept. Further, sub-combinations of these features may constitute additional embodiments of the inventive concept.

According to the forensic system, the forensic method, and the forensic program of the inventive concept, by setting user-specifying information showing which one of users contained in user information each of a plurality of document files is related with, causing the recording unit to record the set user-specifying information, selecting at least one user, searching a document file where user-specifying information corresponding to the selected user was set, setting additional information showing whether or not the searched document file is related with the litigation via the display unit, and outputting a document file related with the litigation based on the additional information, the operator(s) can extract, analyze, and/or evaluate only digital document information classified according to each user related with the litigation, without evaluating all of the acquired digital document information.

Accordingly, the operator(s) can extract only digital document information related with a specific individual from a flood of digital document information, thereby achieving a work load reduction for evidentiary material preparation associated with the litigation.

According to the forensic system, method, and program of the inventive concept, by setting user-specifying information showing that a document file is related with each of a plurality of users, the operator(s) can establish or otherwise set that a single document is related with a plurality of users.

According to the forensic system, method, and program of the inventive concept, when the relationship of the document file with each of a plurality of users and ranking information showing a relative rank order relationship of each of the plurality of users associated with the litigation are set to the user-specifying information, the relationship of a plurality of users with a document file and the rank order showing a relative degree of relationship with the litigation of each user among the plurality of users can be preliminarily set.

According to the forensic system, the method, and program of the inventive concept, when the searching unit searches a document file where user information corresponding to a user having the selected rank order was set, digital document information with which a user related with litigation is related can be searched based on the rank order of the relative degree of relationship.

According to the forensic system, method, and program of the inventive concept, in the case where second digital information containing second digital document information and second user information which are recorded on a second server different from the server is acquired, when not only the digital document information but also a plurality of document files including the second digital document information is searched, all the digital document information recorded on a plurality of servers can be analyzed and evaluated.

According to the forensic system, method, and program of the inventive concept, the text information extracting unit, the keyword selecting unit, and the searching unit are further provided, where, when the additional information setting unit sets additional information to the searched document file, the operator(s) can narrow down only one of the digital document information recorded in the server which was accessed by the specific individual, and a population of digital document information, which is potentially related with the litigation by a predetermined search.

According to the forensic system, the method, and program of the inventive concept, when a document file converted by the data converting unit is processed with the same data format as the converted data format in a period before it is outputted by the output unit, the operator(s) can reduce a wasteful step such as data format conversion in the course of a processing flow and they can exclude a risk of quality degradation of the digital document information.

Further, according to the forensic system, method, and program of the inventive concept, when the statistical data producing unit is provided, since statistical data can be visualized and provided to an operator, the forensic system, method, and program make it possible to grasp labor required for the litigation preparation in an early stage.

Further, according to the forensic system, method, and program of the inventive concept, the digital information acquiring unit can perform difference collection of digital information when acquiring digital document information and folder information which were produced after a time and date previously clocked by the clock unit, so that a load of acquiring the same digital information from a server redundantly each time can be reduced.

The forensic system, method, and program may further include a plurality of additional information setting units. The additional information setting units may set additional information by different operators, thereby enabling a plurality of individuals to evaluate digital document information as preparatory work for submitting evidentiary material to a court of law at an early stage.

DETAILED DESCRIPTION

Embodiments of the inventive concept will be described below with reference to the drawings.

Figure 1:
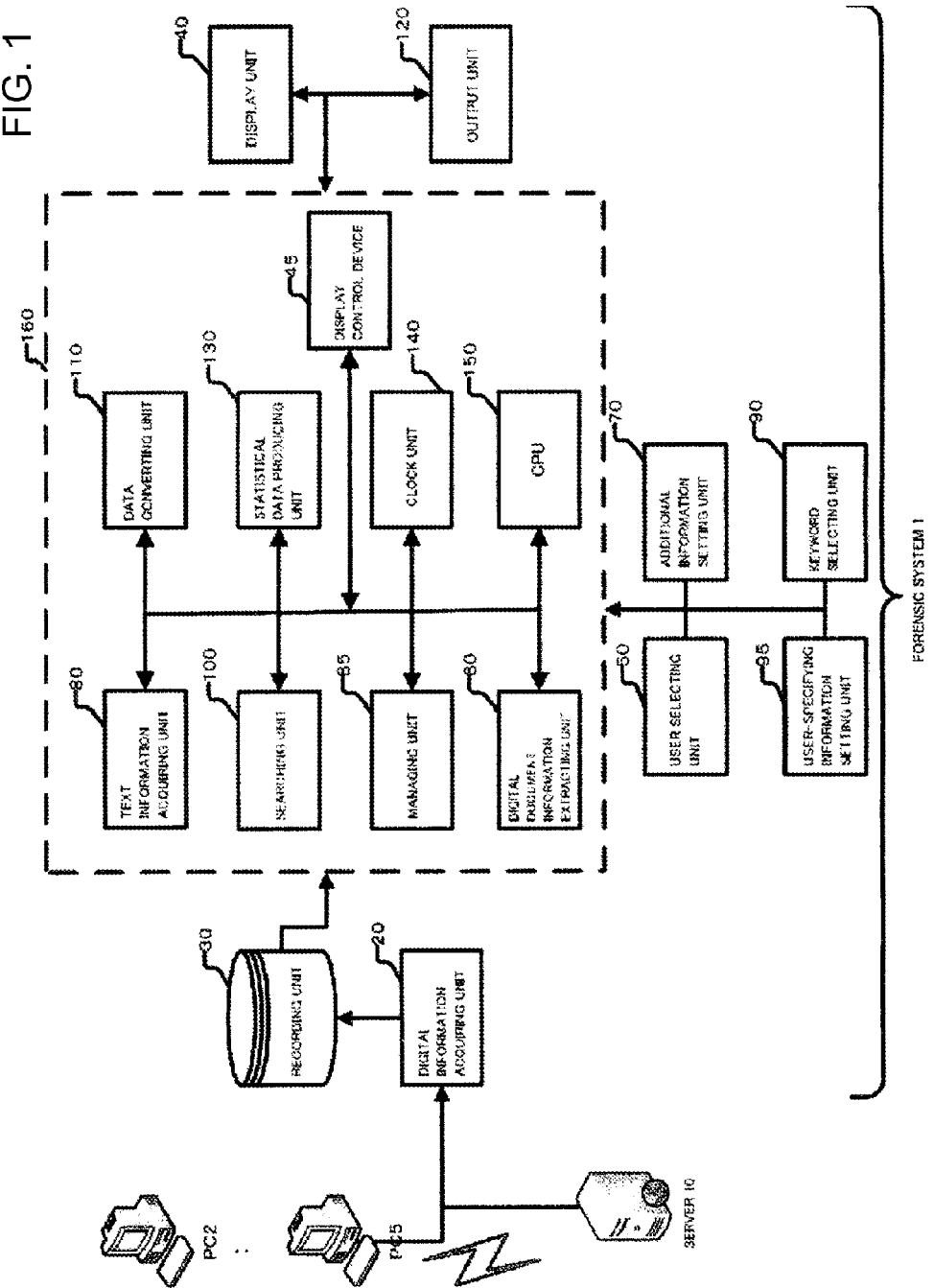
FIG. 1 is a block diagram showing a forensic system in a first embodiment of the inventive concept.

FIG. 1 is a block diagram showing a forensic system 1 in an embodiment of the inventive concept. The forensic system 1 shown in FIG. 1 may acquire digital information recorded on a plurality of computers (e.g., PC2 to PC5) and server 10 to analyze the acquired digital information. The forensic system 1 is provided with digital information acquiring unit 20. The digital information acquiring unit 20 may acquire digital information including digital document information composed of a plurality of document files and/or user information about users using the plurality of computers (PC2 to PC5) or server 10. The recording unit 30 may record the digital information acquired by the digital information acquiring unit 20. The display unit 40 may display the recorded digital information. The user-specifying information setting unit 95 may determine and/or set user-specifying information showing which one of the users contained in the user information 29 is related with each of the plurality of document files 27. In addition, the user-specifying information setting unit 95 may cause the recording unit 30 to record the set user-specifying information, and may confirm the recording via the display unit 40. The user-selecting unit 50 may select at least one user via display unit 40. The searching unit 100 may search a document file for the user-specifying information corresponding to the selected user, which was previously determined and/or set. The additional information setting unit 70 may set, via the display unit 40, additional information showing whether or not the searched document file is related with litigation. The output unit 120 may output a document file related with litigation based on the additional information.

The control unit 160 may include the display control device 45, digital document information extracting unit 60, text information acquiring unit 80, managing unit 85, searching unit 100, data converting unit 110, statistical data producing unit 130, clock unit 140, and/or CPU 150.

Further, forensic system 1 may include a keyboard, a mouse or other suitable data input device (not shown). Alternatively or in addition, the display unit 40 can include a touch panel having a touch panel function. The data input device may include or be connected to the user-selecting unit 50, additional information setting unit 70, keyword selecting unit 90, and/or user-specifying information setting unit 95.

The user information 29 may show users recorded on the computers and/or the server. The user information 29 may include a user ID showing a user who utilized the computers or the server, information showing a user actually edited, produced, or browsed a document file, and/or access information showing when and which digital document information the user accessed.

The user selecting unit 50, additional information setting unit 70, keyword selecting unit 90 and/or user-specifying information setting unit 95 may be separate data input devices, or alternatively, a sole or combined data input device.

The output unit 120 can be, for example, a recording device for recording data in an electronic medium or on other physical media such as paper via a printer.

The forensic system 1 shown in FIG. 1 may execute a forensic program stored in an external storage device (not shown) on CPU 150 of the computer. The forensic program may be stored in a recording medium such as a CD-ROM, or distributed via a network such as the Internet, and/or may be installed in one or more of the PCs or the server 10.

In one embodiment, the forensic system 1 can be a personal computer or associated with a personal computer. The forensic system 1 may be a server or a portable data assistance type of a computer device. In another embodiment, the forensic system 1 may be a system configuration of a network type.

The user-specifying information setting unit 95 may determine and/or set user-specifying information showing which users contained in the user information 29 each of the plurality of document files 27 is related with. In addition, the user-specifying information setting unit 95 may record the set user-specifying information in the recording unit 30. Since the user information 29 recorded on the plurality of computers and the server need not necessarily contain all users related with litigation, a new user can be manually set in addition to the automatically gathered users responsive to an operator's instruction or action.

The user-specifying information setting unit 95 may determine and/or set, to each document file 27, a user who utilized the document file. For example, user-specifying information setting unit 95 may determine and/or set, to the document file 27, user information 29 showing that one or more users are related with the document file. The user-specifying information setting unit 95 may set a single document file 27 to be related with a single user, or it may set a single document file 27 as having been utilized by a plurality of users. The user-specifying information setting unit 95 may set, for example, the relationship of a document file 27 with each of a plurality of users and ranking information (not shown) showing a relative rank order relationship of each of the plurality of users associated with the litigation to the user-specifying information. Thus, while a plurality of users may be set to or associated with a single document file, the relative rank order relationship of each user among the set users associated with litigation can be determined or otherwise set. Further, user-specifying information setting unit 95 may select a relative rank order in the ranking information so that searching unit 100 searches a document file where user-specifying information corresponding to a user having the selected relative rank order was set.

The digital information acquiring unit 20 may acquire digital information recorded in computers PC2 to PC5 or server 10 used by one or more users. For example, the digital information acquiring unit 20 may copy digital information recorded in computers PC2 to PC5 or server 10 to an electronic medium such as USB, CD or DVD. The unit 20 may further copy the digital information to the forensic system 1 via the electronic medium.

The digital information acquiring unit 20 may preserve or otherwise collect the recorded digital information in computers PC2 to PC5 or serer 10 via a network in the case where the forensic system 1 and computers PC2 to PC5 or server 10 are connected to the network.

The digital information acquiring unit 20 may acquire recorded second digital information including second digital document information and second user information in a second server (not shown) different from server 10, so that the forensic system 1 searches not only the digital document information but also a plurality of document files including the second digital document information.

The digital information acquiring unit 20 may collect the recorded second digital information including second digital document information, second user information and second access history information in the second server different from the server 10.

The forensic system 1 may further include a text information extracting unit 80, which may extract text information from each of the document files 27. The forensic system 1 may further include a keyword selecting unit 90, which may select a keyword, and searching unit 100, which may search a document file 27 including the selected keyword based on the extracted text information from the recorded digital document information.

The additional information setting unit 70 may set additional information to the document file searched by the searching unit 100.

The forensic system 1 may further include a data converting unit 110. The unit 110 may convert and normalize digital documents, of the digital document information recorded by unit 30, to a common format. The document file that is converted by the data converting unit 110 may be processed without further converting until being outputted from the output unit 120.

The forensic system 1 may further include a statistical data producing unit 130. The unit 130 may produce statistical data represented by or otherwise based on data size for each data format of the acquired digital document information, and/or statistical data represented by or otherwise based on data size for each data format of the digital document information searched by the searching unit 100.

The forensic system 1 may include a clock unit 140 to determine time and/or date when the digital information is acquired. The digital information may include folder information or other directory hierarchy information indicating where the digital document information is stored. The digital information acquiring unit 20 may acquire only the digital document information and folder information, which were produced after a time and date previously clocked by clock unit 140. The unit 20 may acquire only user information related with the acquired digital document information and/or folder information.

The digital information may include the digital document information, the user information, and/or the folder information. The clock unit 140 may calculate a date and/or time of the digital information, which has been acquired by the digital information acquiring unit 20. The display unit 40 may display content according to an instruction of the display control unit 45 included in control unit 160.

The digital information acquiring unit 20 may selectively acquire, from computers PC2 to PC5 or server 10, digital document information and folder information produced in a period from the $(n-1)^{th}$ to the $n^{th}$ (e.g., n=2, 3, . . . ) acquiring point. The digital information acquiring unit 20 may acquire the digital document information and folder information to further acquire user information related with the acquired digital document information. The server 10 may include at least one server. For example, the server 10 may include a plurality of servers. Moreover, the server 10 may include at least two of a mail server, a file server, and a document managing server.

The forensic system 1 may be used simultaneously by different operators. The additional information setting unit 70 may include a plurality of data input devices. The plurality of display units 40 may correspond in number to the plurality of additional information setting units 70. A plurality of operators may set additional information through the plurality of additional information setting units 70 while simultaneously evaluating digital document information.

The output unit 120 may output digital document information. For example, the output unit 120 may be a printer or other suitable recording device, which records digital information on an electronic medium.

Figure 2:
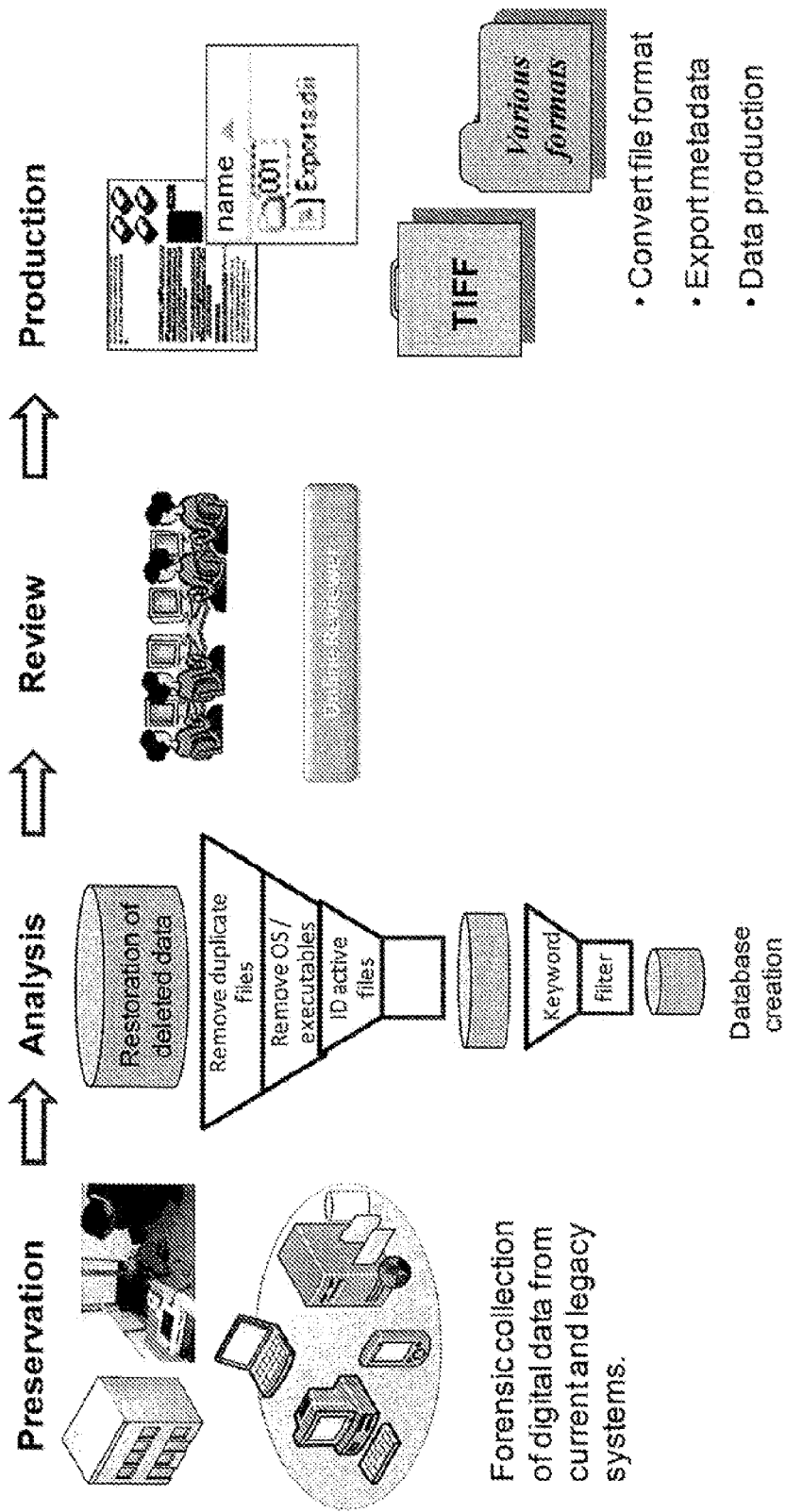
FIG. 2 is a diagram showing a flow of a forensic system service of the inventive concept.

FIG. 2 illustrates a service flow to explain a procedure for performing preparatory work for submission of evidentiary materials to a court of law using the forensic system 1. Reference is now made to the various elements of FIGS. 1 and 2.

When a crime or a legal conflict relating to a computer such as unauthorized access or leakage of confidential information or other so-called "forensic" events occur, it is necessary to collect and analyze devices, data, and/or electronic records, which are needed for investigation into the causes or to otherwise clarify legal evidences thereof. For example, pertaining to civil litigation in the United States of America, since such a procedure as eDiscovery is required, both a plaintiff and a defendant involved in the litigation must submit all related digital information as evidences. They also need to submit digital information recorded in computer(s) and/or server(s) as evidences.

The forensic system 1 may be used to preserve the digital information recorded in computers, for example PC2 to PC5 and server 10, in order to evaluate digital information related with the litigation, thereby conducting preparatory work to submit evidentiary materials to the court of law. Thereafter, the forensic system 1 may register the preserved digital information in a database such as recording unit 30, and analyze the digital information to classify the same based on the keyword search or filtering. The recording unit 30 may be included in one of the computers and/or servers connected to or otherwise included in or associated with the forensic system 1.

The forensic system 1 may provide the classified digital information on the display unit 40. Moreover, the operator(s) may review the data and set additional information to the digital document information via the additional information setting unit 70.

The control unit 160 may include preservation and analysis functions, processing functions, analysis functions, search functions, operator's reviewing functions, and/or producing functions. For example, the preservation and analysis function of the control unit 160 may include a case management function (i.e., a function of managing unit 85), which allows data management for each case. In addition, the control unit 160 may include a file analysis function (i.e., a function of the searching unit 100), which allows analysis of the kind of file and/or a possession amount thereof for each target individual and/or evidentiary material. In addition, the control unit 160 may cause an analysis of a file to be performed or searched. Also, the control unit 160 may cause a file kind selection and/or extraction function to be performed (i.e., a function of the digital document information extracting unit 60), which allows selection of file type to be searched and/or browsed. Additionally, the control unit 160 may cause a preservation function to be performed (i.e., a function of the data converting unit 110), which allows preservation of the selected file as a separate file.

Further, the processing analysis and search function of control unit 160 may have a full-text search function and a frequently-appearing word and phrase top-extraction function (i.e., functions of the searching unit 100). The full-text search function may be compatible with multi-language, allows AND, OR, and NOT searches by Boolean operation, and/or a grouping search. In addition, the full-text search function may have a highlight display function of a searched word or phrase and/or a conversion function to meta data. Further, the full-text search function may have an advanced search function such as neighborhood search. The frequently-appearing word and phrase top-extraction function is for extracting a frequently-appearing word or phrase within certain digital document information.

The review function of the control unit 160 may include, for example, an e-mail family browsing processing function (i.e., a function of searching unit 100), which allows collective browsing of an e-mail family. In addition, the control unit 160 may include a free-design tag function (i.e., a function of searching unit 100), which allows search for material provided with one evaluation or a plurality of evaluations as additional information based on the evaluation(s). Further, the control unit 160 may include a free-design book-mark function (i.e., a function of the searching unit 100), which allows book-mark search for material set with a hierarchy structure book-mark. Also, the control unit 160 may include a free-input comment column (i.e., a function of the managing unit 85) including a comment column in which any number of characters can be inputted. In addition, the control unit 160 may include a simultaneous browsing function for the above-described plurality of operators to evaluate digital document information. Further, the control unit 160 may include an access right control function (i.e., a function of managing unit 85), which allows setting of such rights as an access right, manager right, browsing-only right, or the like, for each case, for each account of a browser when performing review. Moreover, the control unit 160 may include a writing-within-document memo function (i.e., a function of the managing unit 85), which allows writing within a document without changing the text of the digital document information. In addition, the control unit 160 may include a case management function (i.e., a function of the managing unit 85), which allows display of the number of review-completed documents (e.g., in terms of a percentage).

The control unit 160 may also include an e-mail threading function (i.e., a function of the managing unit 85), which displays e-mail threads (such as returning, forwarding, or the like) collectively. Furthermore, the control unit 160 may include a mail analysis display function (i.e., a function of the statistical data producing unit 130), which displays transmissions and receptions of mails graphically. In addition, the control unit 160 may include a similar document display function (i.e., a function of the managing unit 85), which performs automatic classification of similar documents such as draft or old-version documents, and may cause the documents to be displayed. Further, the control unit 160 may include a similar document difference highlight function (i.e., a function of the managing unit 85), which highlight-displays only a portion of a difference between similar documents. Also, the control unit 160 may include a previous and next texts-search hit portion display function (i.e., a function of the searching unit 100), which displays only the surrounding area of a word or a phrase hit by searching.

The production function of the control unit 160 may include various output functions. The output functions can be performed by the output unit 120 according to an instruction from the managing unit 85. The output can be an XML output of such information including, for example, an actual file, meta information, tag information, comma-separated value (CSV) information, and/or various other suitable load file outputs. Additional functions can include a batch printing function (i.e., a function where output can be performed by the output unit 120 according to an instruction from the managing unit 85), which prints the selected digital document information.

The forensic system 1 may produce acquired data in an electronic medium using the output unit 120. For example, the forensic system 1 may record data in an electronic medium with a common data format by a recording device.

Figure 3:
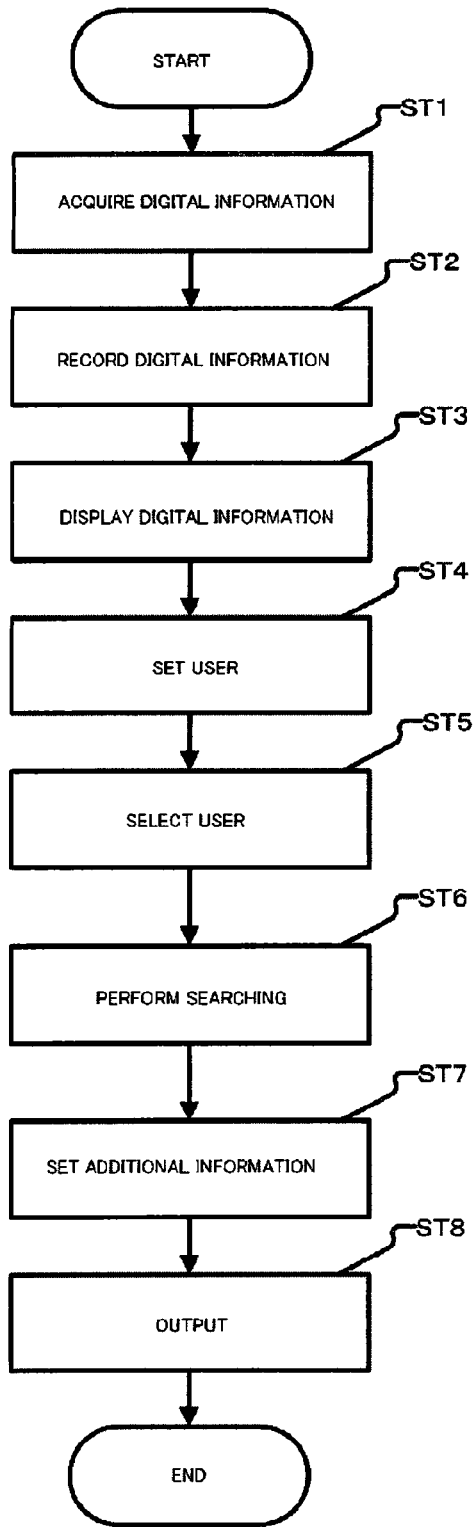
FIG. 3 is a flow chart showing a forensic process of the forensic system of the inventive concept.

A procedure for performing preparatory work for submission of evidentiary materials to a court of law using the forensic system 1 will be described in detail with reference to the flowchart shown in FIG. 3.

The digital information acquiring unit 20 may acquire digital information including digital document information in a common format such as Word® format, PDF format, PPT format, and/or Excel® format, and may also acquire user information about users who used the computers PC2 to PC5 or server 10 (ST1).

Explanation is made assuming that the number of the computers (e.g., PC2 to PC5), which users utilized is four. However, it will be understood that the number of PCs is not limited to four, and any suitable number of computers can be used. The digital information acquiring unit 20 may record the acquired digital information to recording unit 30 (ST2). The display unit 40 can display the digital information (e.g., the digital document information, the user information, and/or information showing only title of the digital information) via the control unit 160 (ST3). For example, according to an instruction from the display control unit 45, the display unit 40 may display all of the user information and/or the digital document information. In addition, the display unit 40 may display attribute information (e.g., a name of a user or a file name of a document file).

By way of another example, using a confirming screen of the display unit 40, the operator(s) may login to the forensic system 1 and further produce a case, which is a unit of the uppermost data group in the database of the forensic system 1. Further, while using the confirming screen of the display unit 40, the operator(s) may set a connection destination of a server corresponding to the recording unit 30 in which the digital information has been recorded. The operator(s) may further manage the association between the server and the recording unit 30. In some embodiments, a plurality of recording units 30 are present.

Further, while using the confirming screen of the display unit 40, the operator(s) may set a custodian (i.e., a data-holding target individual or a user) and management thereof. In addition, while using the confirming screen of the display unit 40, the operator(s) may produce target digital document information (i.e., a middle data group unit in the database of the forensic system 1), or target information-collected and preserved, and may control the status thereof. Though described later, while using the confirming screen of the display unit 40, the operator(s) may make a connection of the custodian to the target information-collected and preserved. For example, while using the confirming screen of the display unit 40, the operator(s) may preset which custodian was related with the litigation to a plurality of targets composed of the digital document information acquired from computers PC2 to PC5 or server 10. Thus, the control unit 160 can acquire the digital information recorded in the recording unit 30 to analyze the digital information by the various functional units.

The forensic system 1 may include the statistical data producing unit 130, which produces statistical data represented by or otherwise based on data size for each data format of the digital document information recorded in recording unit 30, or statistical data represented by or otherwise based on data size for each data format of the digital document information searched by searching unit 100.

For example, while using the confirming screen of the display unit 40, the operator(s) can select a custodian to be analyzed and a predetermined path (e.g., directory) from a target corresponding to the custodian to display a list of an analysis result of the number of files and a size for each custodian. Further, while using the confirming screen of the display unit 40, the operator(s) can display the list of the analysis result of the number of files and a size for each path (e.g., directory) as a chart. Further, while using the confirming screen of the display unit 40, the operator(s) can display the analysis result of the number of files and a size for each path (e.g., directory) as a list. Further, while using the confirming screen of the display unit 40, the operator(s) can display the list of the analysis result of the number of files and a size for each file type as a chart. Further, while using the confirming screen of the display unit 40, the operator(s) can display the list of the analysis result of the number of files and a size for each file type.

Moreover, while using the confirming screen of the display unit 40, the operator(s) can display the list of the analysis result of the number of files and a size for each file type as a chart. Further, while using the confirming screen of the display unit 40, the operator(s) can display the list of the analysis result of the number of files and a size for each file type of only a text-searchable file as a chart. The text-searchable file is a file where text information can be preliminarily extracted from the digital document information recorded in the recording unit 30 by the text information acquiring unit 80.

Next, the operator(s) can operate the user-specifying information setting unit 95 via display unit 40 to set, for each of the document files, the user-specifying information showing which one (i.e., which custodian) of the users contained in the user information the document file is related with, and then set the recording unit 30 to record the set user-specifying information (ST4). Specifically, while using the confirming screen of the display unit 40, the operator(s) can make a connection of each document file constituting target information-collected and preserved to a user related with the litigation. The users may be represented by computer IDs of the users, and/or by any information described above contained in the user information. Specifically, while using the confirming screen of the display unit 40, the operator(s) may set each document file to be provided with a proper user ID of user IDs (or user names) selected from the user information. Since the user information recorded on the plurality of computers or the server need not necessarily contain all users related with the litigation, the operator(s) can also additionally set a new user manually.

Further, the operator(s) may cause the user-specifying information setting unit 95 to set, to the document file, the user-specifying information showing that a plurality of users are related with the document file. The operator(s) may adjust a setting such that a single document file is related with a single user, or alternatively, the operator(s) may adjust a setting such that a single document file is utilized by a plurality of users. The operator(s) may also operate the user-specifying information setting unit 95 to set the relationship of the document file with a plurality of users and ranking information showing a relative rank order and/or relative degree of relationship of each of the plurality of users with the litigation, to the user information.

Accordingly, when adjusting a setting such that a single document file is related with a plurality of users, the operator(s) can set the rank order showing a relative degree of relationship with litigation of each user among the plurality of users. Further, the operator(s) may select a relative rank order of the ranking information by user-specifying information setting unit 95 so that searching unit 100 searches a document file where the user-specifying information corresponding to a user having the selected relative rank order was set.

While using the confirming screen of the display unit 40, the operator(s) may select at least one user (e.g., custodian) by user selecting unit 50 (ST5). For example, ID information or name information of Mr. Koh (e.g., a personal name) when such person uses the computers or the server is preliminarily recorded as the user-specifying information in recording unit 30 so that the operator(s) can select such person's ID, Mr. Koh, and/or another individual on the display unit 40. The operator(s) can select a specific user on a selection screen of the display unit 40 to search a document file. The searching unit 100 may search a document file where the user-specifying information corresponding to the selected user was set (ST6).

For example, when the operator(s) select Mr. Koh (e.g., personal name of a custodian), by user selecting unit 50, since relationships between document files and users (e.g., custodians) are set by user-specifying information setting unit 95, the operator(s) can also extract only a document file related with the selected user from the document files in the target.

The example of Mr. Koh has been described, but when a plurality of custodians such as Mr. Otsu (e.g., another personal name of a custodian) in addition to Mr. Koh are selected, only a document file related with Mr. Koh and Mr. Otsu can be extracted. Also, as described above, the operator(s) can perform AND, OR, or NOT search of Mr. Koh and Mr. Otsu. The operator(s) can also select a relative rank order of the ranking information, in addition to at least one user, by user selecting unit 50. This causes searching unit 100 to search a document file where user-specifying information corresponding to the user having the selected relative rank order was set.

In the case where the ranking information showing a relative rank order of relationship of each of a plurality of users with litigation is set in the user-specifying information, for example, the operator(s) may use the user-specifying information setting unit 95 to set Mr. Koh, who has the highest or closest relationship with litigation at "first," and set Mr. Otsu, who has the second highest or closest relationship at "second" in a certain document file. Then, when searching, the operator(s) can search a document file where the custodian is Mr. Otsu and the relative rank order of Mr. Otsu is "second."

Further, the function of searching unit 100 allows the operator(s) to perform a search other than narrowing-down by user, while using the confirming screen of the display unit 40. The display control unit 45 function allows the operator(s) to perform simple browsing, while using the confirming screen of the display unit 40. The simple browsing allows the operator(s) to grasp the contents of the digital document information quickly and efficiently.

The operator(s) may set additional information to the extracted document files in the digital document information to indicate whether or not each of the document files is related with litigation (ST7). Specifically, the operator(s) may add a tag for each document file depending on its relationship with the litigation. The tag (e.g., additional information) may include "hot" for a file related with the litigation, "responsive" for one which may potentially be related with the litigation, and/or "not responsive" for one which is not related with litigation. More specifically, the operator(s) may input a tag by clicking a file row in a batch list.

The operator(s) may use the output unit 120 to output the document file related with the litigation based on the additional information. CPU 150 may receive the operator's output from the output unit 120 so as to perform outputting. For example, the operator(s) may output only a document file attached with "hot," or may output document files attached with "hot" and "responsive," among other possibilities and combinations. The output unit 120 may output a document file related with the litigation based on the additional information and/or based on the instruction from the CPU 150 (ST8).

The forensic system 1 may include or otherwise be associated with a plurality of servers. The forensic system 1 may include a digital information extracting unit and a searching unit. The digital information extracting unit and searching unit may be separated into the various servers to form the forensic system. The separated forensic systems may be connected via a network.

Figure 4:
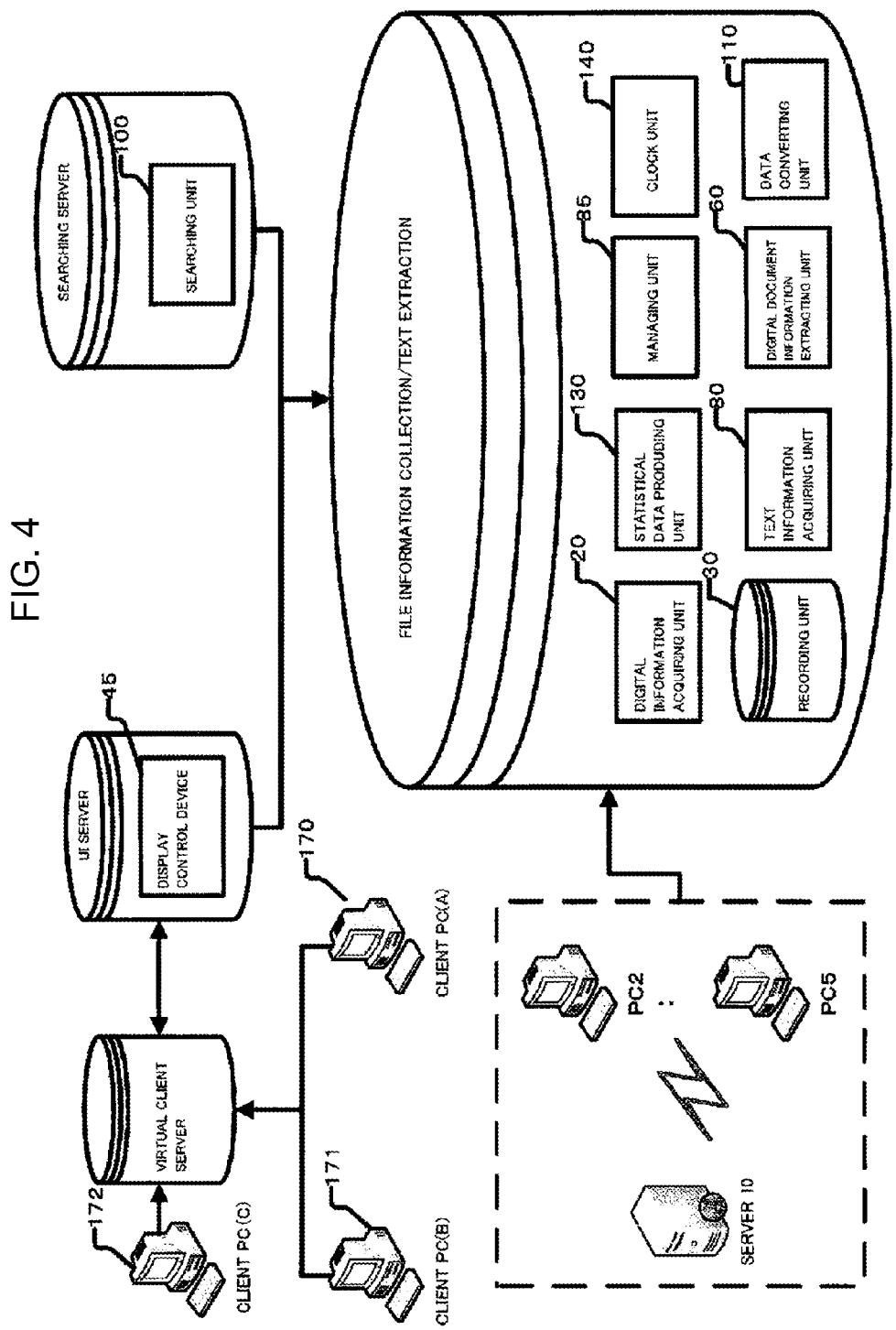
FIG. 4 is a block diagram showing a forensic system in a second embodiment of the inventive concept.

By way of another example, a second embodiment will be described with reference to FIG. 4. The forensic system 1 may have a system configuration of a network type as shown in FIG. 4. The second embodiment of the inventive concept of the forensic system 1 may include processing units similar to those of the forensic system 1 explained in the first embodiment of the inventive concept. The processing units are located separately in a plurality of servers. The servers are connected to each other via a network. Therefore, the servers may be located within the country, and the servers may be located in a distributed manner regardless of home and/or abroad.

According to the forensic system 1, the user selecting unit 50, additional information setting unit 70, keyword setting unit 90, and user-specifying information setting unit 95 can correspond to a data input device provided in each of clients PC170, 171, and 172.

The display unit 40 can correspond to each of client computers PC170 to 172. The display response of the display unit 40 can be improved by collecting data transmissions and receptions in a virtual client/server in a bundle between a plurality of clients (e.g., PCs) and a user interface (UI) server.

Thus, the forensic system 1 may be configured by the computer in a similar fashion as the first embodiment of the inventive concept, or alternatively, the forensic system 1 may be configured by the system of the network type similar to the second embodiment of the inventive concept.

Accordingly, the forensic system 1 may set, for each of a plurality of document files, user-specifying information showing which users contained in the user information the document file is related with. In addition, the forensic system 1 may set recording unit 30 to record the set user-specifying information, selecting at least one user, search a document file where user-specifying information corresponding to the selected user was set, set additional information showing whether or not the searched document file is related with litigation via display unit 40, and/or output a document file related with the litigation based on the additional information. The forensic system 1 can extract, analyze, and/or evaluate only digital document information classified according to each user related with litigation, and need not validate all of the acquired digital document information.

In some embodiments, the forensic system 1 can extract only digital document information related with a specific individual from a flood of digital document information, thereby achieving a work load reduction for evidentiary material preparation in connection with the litigation.

According to the forensic system, method, and program of the inventive concept, by setting user-specifying information showing that a document file is related with each of a plurality of users, the forensic system can set a single document to be related with a plurality of users.

According to the forensic system 1, when the relationship of the document file with each of a plurality of users and the ranking information showing a relative rank order relationship of each of the plurality of users with the litigation are set to the user-specifying information, the operator(s) can preliminarily specify that a plurality of users are related with a document file and the rank order showing a relative degree of relationship with the litigation of each user among the plurality of users.

According to the forensic system 1, when the searching unit 100 searches a document file where user-specifying information corresponding to a user having the selected rank was set, the operator(s) can search the digital document information with which a user related with litigation is related based on the rank order showing the relative degree of relationship.

According to the forensic system 1, when second digital information containing second digital document information and second user information, which have been recorded on a second server different from server 10 is acquired, and when not only the digital document information but also a plurality of document files constituting the second digital document information is searched, the operator(s) can analyze and validate all of the digital document information recorded on the servers.

According to the forensic system 1, the text information extracting unit 80, keyword selecting unit 90, and searching unit 100 are provided, and when additional information setting unit 70 sets additional information to the searched document file, the operator(s) can narrow down only one of the digital document information recorded in the server, which was accessed by the specific individual, and a population of the digital document information, which is potentially related with the litigation by a predetermined search.

According to the forensic system 1, when the document file converted by the data converting unit 110 is processed with the same data format as the converted data format in a period before it is outputted by the output unit 120, the operator(s) can reduce a wasteful step such as data format conversion in the course of the processing flow, and they can exclude a risk of quality degradation of the digital document information.

According to the forensic system 1, when the statistical data producing unit 130 is further provided, statistical data can be visualized and provided to the operator(s), so that labor required for litigation preparation can be grasped early and efficiently.

Further, according to the forensic system 1, when the digital information acquiring unit 20 acquires only the digital document information and folder information, which were produced after the date and time previously clocked by clock unit 140, the operator(s) can perform a difference collection of the digital information, which can reduce the load for acquiring the same digital information from such a device as the server redundantly each time. According to the forensic system 1, when a plurality of additional information setting units are provided, additional information setting units 70 can set additional information by different operators, so that the operators can perform preparatory work at an early stage by a plurality of operators making a determination about whether or not digital document information is evidentiary material to a court of law.

The embodiments of the inventive concept have been described above, but the technical scope of the inventive concept is not limited to the scope described in the above-described embodiments. It is apparent that various modifications or improvements can be applied to the above-described embodiments. It is apparent from the description of the scope of claims that an aspect which has been applied with such a modification or improvement can also be included in the technical scope of the inventive concept.

Further, the forensic systems 1 of the first embodiment and the second embodiment may be configured by combining the respective whole systems or respective processing units of the respective forensic systems 1.

The invention claimed is:

1. A forensic system configured to acquire digital information recorded on a plurality of computers or a server to analyze the acquired digital information, the forensic system comprising:
   at least one or more processors configured to operate as:
   a digital information acquiring unit configured to acquire digital information containing digital document information composed of a plurality of document files, and to acquire user information about users using the plurality of computers or the server;
   a recording unit configured to record therein the digital information acquired by the digital information acquiring unit;
   a display unit configured to display the recorded digital information, a display response of the display unit controlled by collecting transmission and receiving information in a virtual client/server between a plurality of clients and a user interface server;
   a user-specifying information setting unit configured to set user-specifying information showing which one of users contained in the user-specifying information each of the plurality of document files is related, and configured to cause the recording unit to record the set user-specifying information, via the display unit;
   a user selecting unit configured to select at least one user via the display unit;
   wherein the user-specifying information further sets ranking information showing a relative degree of relationship of a first user with a litigation and a relative degree of relationship of second user with the litigation, and
   said recording unit further configured to record middle group data as target digital information in conjunction with a confirmation screen on the display unit in a database of the forensic system, said middle group data being controllable as a group, and wherein the confirmation screen displays case information as an uppermost data group, and is further configured to set a connection destination of a server corresponding to the recording unit based on user input, and to manage association between the server and the recording unit based on user input; and
   a control unit, comprising:
   a searching unit configured to search a document file from among the target digital information where the user-specifying information corresponding to the selected user was set, and said searching unit provides a search result of at least one document to be analyzed based on the relative degree of relationship of the users, and said device further includes an output unit to output the search result, and said searching unit analyzing the search result of the at least one document according to at least one of a kind of file and a time of possession of the search result;
   a highlight display unit configured to highlight, on the display unit, a searched word or phrase;
   a case management unit (A), which allows data management for each case;

a managing unit including an access right control unit configured to set one or more rights for each of a plurality of accounts associated with a browser,
wherein the one or more rights set by the managing unit includes an access right for each case, a browsing-only right, and a manager right associated with the browser;
a free-design tag unit, which allows search for material provided with one evaluation or a plurality of evaluations as additional information based on the evaluation(s);
a free-input comment column including a comment column in which any number of characters can be inputted;
a case management unit (B), which allows display of the number of review-completed documents;
a digital document extracting unit configured to select a kind of file to be searched;
a data converting unit configured to preserve a selected file as a separate file; and
a plurality of additional information setting units configured to set additional information showing whether or not the searched document file is related with the litigation, wherein the additional information includes one of a first tag indicating that the searched document file is related with the litigation, a second tag indicating that the searched document file is potentially related with the litigation, and a third tag indicating that the searched document file is not related with the litigation, wherein the plurality of additional information setting units may simultaneously receive additional setting information from a plurality of users while evaluating digital document information.

2. The forensic system according to claim 1, wherein said control unit further comprises an e-mail family browsing processing unit, which allows collective browsing of an e-mail family.

3. The forensic system according to claim 1, wherein said control unit further comprises an e-mail threading unit, which displays e-mail threads collectively.

4. The forensic system according to claim 1, wherein said control unit further comprises a mail analysis display unit, which displays transmissions and receptions of mails graphically.

* * * * *